March 28, 1944.    R. A. GOEPFRICH    2,345,108
BRAKE
Filed April 9, 1942

INVENTOR
RUDOLPH A. GOEPFRICH
BY
*M. W. McConkey*
ATTORNEY

Patented Mar. 28, 1944

2,345,108

UNITED STATES PATENT OFFICE 2,345,108

BRAKE

Rudolph A. Goepfrich, South Bend, Ind., assignor to Bendix Aviation Corporation, South Bend, Ind., a corporation of Delaware Application April 9, 1942, Serial No. 438,261

8 Claims. (Cl. 188—79.5)

This invention relates to brakes and particularly to automatic adjustments for brakes. The automatic adjustment mechanism disclosed herein is particularly applicable to brakes of the internal shoe-external drum variety.

One object of the invention is to furnish an automatic brake adjustment adaptable to the type of brake which has a plurality of brake shoes each individually shiftable to anchor at one end or the other according to the direction of rotation of the brake drum at the time of shoe contact therewith. The invention disclosed in this application may be utilized in association with any type of brake, but it has been developed for the particular purpose of utilization in the type just referred to because some difficulty has been encountered in adapting automatic adjustments to individually shiftable shoe brakes.

A further object is to provide an automatically adjustable brake as described above which cannot be over-adjusted as a result of heating and expansion of the brake drum. In this instance I prevent over-adjustment by utilization of a thermostatically controlled device. A feature of my improved automatically adjustable brake is the positioning of the thermostatically controlled device adjacent the brake drum, which is the part of the brake subjected to the greatest heat.

A further object of my invention is to furnish an automatic adjustment improved in various details over previous devices of the same type, the improvements including use of a spring between the adjusting device and one of the shoes which both actuates the adjusting device and unbalances the retaining forces exerted on the shoes in release; operation of the adjusting device to accomplish adjustment during the release movement of the brake shoes and therefore under relatively light load; and accomplishment of the adjustment without interference with normal operation of the various brake components.

Other objects and features of my invention will become apparent during the description of an illustrative embodiment shown in the accompanying figures, of which:

Figures 2, 3:
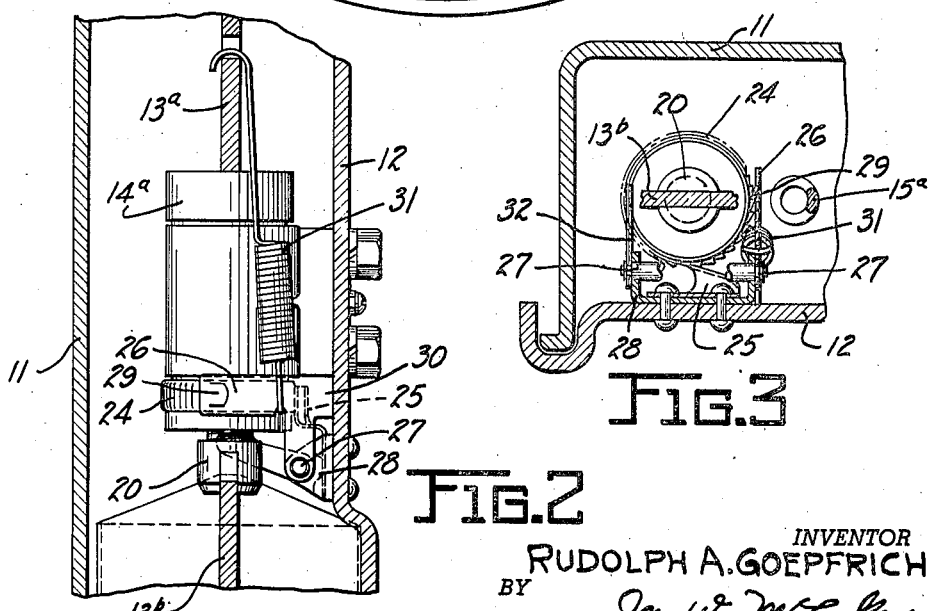
Figure 2 is a section taken on the line 2—2 of Figure 1.
Figure 3 is a section taken on the line 3—3 of Figure 1.

As explained above, the background I have chosen to utilize for illustrating my invention is a brake of the individually shiftable shoe type. The brake shown in Figure 2 comprises generally a rotatable brake drum 11, and a non-rotatable assembly for at times exerting a frictional resistance to rotation of the drum. The said non-rotatable assembly includes a support or backing plate 12, a pair of arcuate brake shoes 13a and 13b capable of slight movement relative to the backing plate, and located between the ends of the shoes and a pair of hydraulic actuators 14a and 14b which are capable of moving the shoes against the brake drum and which at the same time serve as anchors for transmitting the braking torque from the shoes to the backing plate and as positioners for the shoes in release. A pair of return springs 15a and 15b urge the shoes toward one another to hold them normally out of contact with the drum, while a pair of hold-down devices 16a and 16b maintain the shoes in proper lateral position.

The brake shown is in all respects symmetrical, the hydraulic actuators 14a and 14b being identical, and the automatic adjusting devices for the two shoes being likewise identical. It will therefore be understood, that, should a lapse occur into specific description of actuator 14a, which is shown in section the remarks and statements made relative thereto apply equally to actuator 14b. Each of the actuators, as will be seen by observing actuator 14a, comprises a casing 17 which may be bolted to the backing plate and which is formed with a cylindrical bore, a pair of pistons 18a and 18b reciprocable in the bore, and caps 19a and 19b for transmitting thrust between the pistons and the brake shoes and for anchoring the shoes against the cylinder casing. Brake shoe 13a bears directly against cap 19a, while brake shoe 13b is connected with cap 19b through an adjusting screw 20. The adjusting screw 20 has a head forked to receive the web of shoe 13b and a threaded stem 22 screwed into a threaded opening in the cap 19b. As the shoe lining wears, adjustment is accomplished by moving the shoes toward the drum. This movement is accomplished at one end of each shoe by rotating the cap 19b to force the stem 22 of the adjusting screw in the direction of the shoe, rotation of the adjusting screw being limited by the forked contact of the screw head with the shoe web. The cap 19b has an outer flange ratcheted to form a series of teeth 24. Turning or rotating of the cap 19b to accomplish adjustment is permitted in only one direction, It will be seen clearly in Figures 2 and 3 that a leaf spring 25 secured to the backing plate is so positioned as to prevent counterclockwise (see Fig. 3) but to allow clockwise rotation of the cap.

Automatic adjustment of the cap is directly accomplished by a lever 26 fixed to a shaft 27 journalled in a V shaped bracket 28 which is secured to the backing plate. At one end of the lever 26 is a pawl 29 in contact with the teeth 24 of the ratcheted cap. A projection 30 on the lever 26 rests against the backing plate 12 while the shoes and pistons are in released position. A spring 31, connected between the web of shoe 13a and the lever 26 at a point intermediate the pawl 29 and the projection 30, serves to urge the lever 26 to the rest position in which projection 30 contacts the backing plate.

Fixed to the shaft 27, preferably at the side of the cylinder opposite the lever 26 and near the drum is a bi-metal lever 32 which comprises two strips of metal having different coefficients of expansion, the less expansible strip facing the brake drum and the more expansible strip facing the axis of the cylinder and the lever 26. The metal strips are secured together so that heat will cause a bending movement of the lever toward the brake drum and away from the hydraulic cylinder. The levers 32 and 26 and the shaft 27 form, in effect, a single bell-crank lever. The bi-metal lever 32 is normally, i. e., when unheated, in the path of movement of the cap 19b (see Figure 3).

Figure 1:
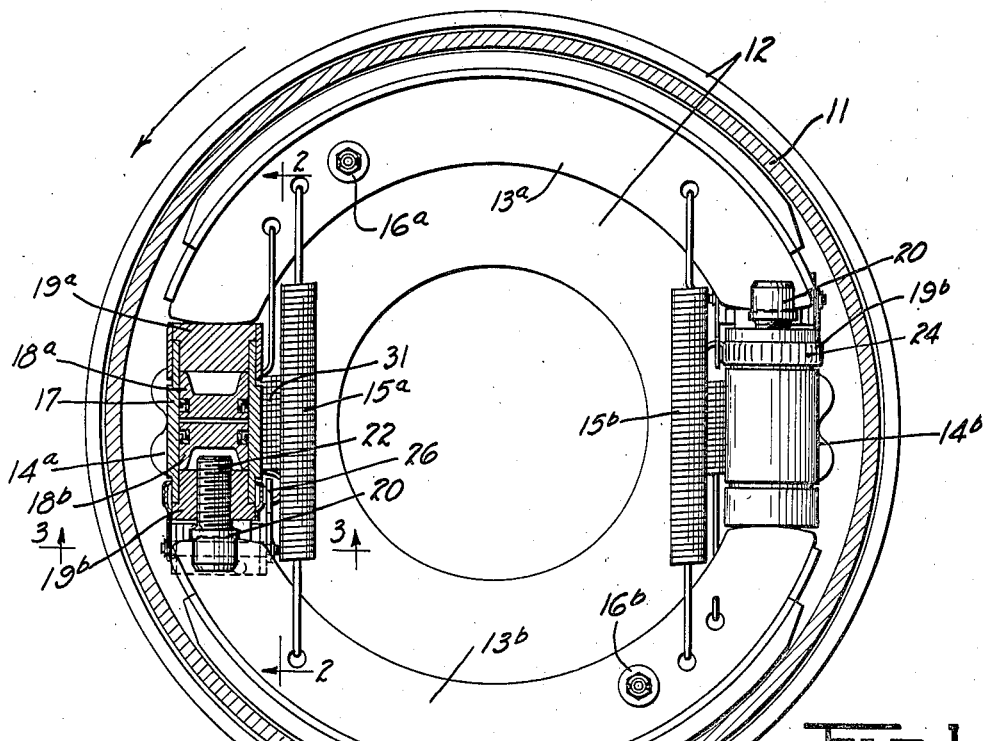
Figure 1 is a sectional view of a brake assembly taken on a vertical plane just inside the head of the brake drum and showing the brake shoes in side elevation.

Operation of the drum is as follows: When the brakes are applied in forward direction, while the drum is rotating, as shown by the arrow in Fig. 1, the piston 18b moves the cap 19b and the adjusting screw 29 out to press the shoe 13b against the drum. When the cap 19b moves it also pushes on the bimetal lever 32 which turns shaft 27 and lever 26, which may be made of spring steel.

The above mentioned movement causes pawl 29 of lever 26 to move from the backing plate toward the brake drum. When the piston movement, due to clearance take-up plus shoe lining wear, reaches a predetermined amount, the pawl 29 picks up a new tooth on the ratcheted surface 24 which is part of the cap 19b. On the release stroke, as the piston returns, the spring 31 returns the lever 26 until its projection 30 rests on the backing plate. Thus the cap 19b has been rotated the length of one tooth, thereby moving screw 22 outwardly to make an adjustment.

Since lever 32 is bimetal, it will bend when heated. Thus, when the brake gets hot, the lever 32 bends outwardly toward the drum and out of the path of movement of cap 19b. Therefore, no adjustment is made while the brakes are hot. This prevents overadjustment. Note the proximity of the bimetal to the brake drum.

Due to the geometry, the effect of spring 31 on the reverse piston 18a is greater than on the forward piston 18b. This is true because the perpendicular distance from the pivot 27 to the line of force between lever 32 and cap 19b is greater than the perpendicular distance from the pivot to the line of force between spring 31 and lever 26. Therefore, the forward piston 18b always moves first. Thus, the adjusting spring 31 acts also as an unbalancing spring.

It will be noted that the adjustment takes place on the release stroke of the piston when there is no load on the cap 19b. The spring 25 as mentioned above, prevents the ratchet from turning backwardly when the pawl 29 moves to pick up a tooth.

If for any reason the screw should become frozen in cap, or the automatic adjustment should fail to operate, the brake pedal would approach the floor boards as the lining wears, exactly as it does in conventional brakes now. Therefore, failure of the automatic adjustment does not create a hazard.

It will be understood that the mechanism described above is duplicated on cylinder 14b, the adjusting as to each shoe being done at the end of the shoe which is applied and therefore not anchored during forward rotation of the brake drum.

I claim:

1. An automatically adjustable brake comprising a rotatable brake drum, a non-rotatable support, a shoe mounted on the support, means for shifting the shoe to apply against the drum, means for adjusting the released position of the shoe to compensate for shoe wear, a ratcheted member for actuating the adjusting means, and a bell-crank lever having a pawl for controlling the ratcheted member and having a bi-metal element urged to move the pawl by motion of the shoe shifting means in a shoe applying direction except when the bi-metal element is heated more than a predetermined amount.

2. An automatically adjustable brake comprising a rotatable brake drum, a non-rotatable support, a pair of brake shoes mounted on the support and individually shiftable to anchor at either end according to the direction of drum rotation, a pair of hydraulic cylinders between the ends of the shoes, pistons in each of the cylinders for moving the shoes against the drum, means for adjusting the released positions of the shoes relative to the pistons to compensate for shoe wear, a pair of ratcheted members one associated with each shoe for actuating the adjusting means, a pair of bell-crank levers having pawls for controlling the ratcheted members and bi-metal elements urged to move the pawls by motion of the pistons in a shoe applying direction except when the bi-metal elements are heated more than a predetermined amount.

3. An automatically adjustable brake comprising a rotatable brake drum, a non-rotatable support, a pair of brake shoes mounted on the support, and individually shiftable to anchor at either end according to the direction of drum rotation, a pair of hydraulic cylinders between the ends of the shoes, pistons in each of the cylinders for moving the shoes against the drum, means for adjusting the released positions of the shoes relative to the pistons to compensate for shoe wear, and means to automatically operate the adjusting means including a lever responsive to thermostatic conditions normally driven by shoe applying movement of the pistons but adapted to bend out of the path of such movement whenever the heat of the brake is more than a predetermined amount.

4. An automatically adjustable brake comprising a rotatable brake drum, a non-rotatable support, a pair of brake shoes mounted on the support and individually shiftable to anchor at either end according to the direction of drum rotation, a pair of hydraulic cylinders between the ends of the shoes, pistons in each of the cylinders for moving the shoes against the drum, means for adjusting the released positions of the shoes relative to the pistons to compensate for shoe wear, and means to automatically operate the adjusting means including a member responsive to thermostatic conditions normally driven by shoe applying movement of the pistons but adapted to bend out of the path of such movement whenever the heat of the brake is more than a predetermined amount.

5. An automatically adjustable brake comprising a rotatable brake drum, a non-rotatable support, a shoe mounted on the support, means for shifting the shoe to apply against the drum, a bracket mounted on the support, a shaft carried by the bracket, a lever sensitive to thermostatic conditions fixed to the shaft and in the path of movement of the shoe shifting means except when heated more than a predetermined amount, a second lever fixed to the shaft, a rotatable member adapted to be rotated by said second lever and an adjusting screw movable longitudinally in response to rotation of the rotatable member and adapted to adjust the position of the shoe to compensate for shoe wear.

6. An automatically adjustable brake comprising a rotatable brake drum, a non-rotatable support, a shoe mounted on the support, means for shifting the shoe to apply against the drum, a bracket mounted on the support, a shaft carried by the bracket, a lever sensitive to thermostatic conditions fixed to the shaft and in the path of movement of the shoe shifting means except when heated more than a predetermined amount, a second lever fixed to the shaft, a movable member controlled by said second lever and an adjusting screw movable in response to movement of the movable member to adjust the position of the shoe to compensate for shoe wear.

7. An automatically adjustable brake comprising a rotatable brake drum, a non-rotatable support, a shoe mounted on the support, means for shifting the shoe to apply against the drum, means for adjusting the released position of the shoe to compensate for shoe wear, a ratcheted member for actuating the adjusting means, a bell crank lever having a pawl for controlling the ratcheted member, and a bi-metal element connected by a shaft to said bell crank lever and adapted to move said pawl by the motion of the shoe shifting means in a shoe applying direction except when the bi-metal element is heated more than a predetermined amount.

8. An automatically adjustable brake comprising a rotatable brake drum, a non-rotatable support, a pair of brake shoes mounted on the support and independently shiftable to anchor at either end according to the direction of drum rotation, a pair of hydraulic cylinders between the ends of the shoes, pistons in each of the cylinders for moving the shoes against the drum, means including a bell-crank lever for adjusting the released positions of the shoes relative to the pistons to compensate for shoe wear, and means to operate the adjusting means including a lever for actuating the said bell-crank lever responsive to thermostatic conditions and normally driven by the shoe applying movement of the pistons but adapted to bend out of the path of such movement whenever the heat of the brake is more than a predetermined amount.

RUDOLPH A. GOEPFRICH.